(12) United States Patent
Barneron et al.

(10) Patent No.: US 9,414,474 B2
(45) Date of Patent: Aug. 9, 2016

(54) ELECTROSTATIC DISCHARGE DEVICE

(71) Applicant: Compagnie Industrielle et Financiere d'Ingenierie "Ingenico", Paris (FR)

(72) Inventors: Sylvain Barneron, Bourg-les-Valence (FR); Alain Soubirane, Bourg-les-Valence (FR)

(73) Assignee: INGENICO GROUP, Paris (FR)

( * ) Notice: Subject to any disclaimer, the term of this patent is extended or adjusted under 35 U.S.C. 154(b) by 84 days.

(21) Appl. No.: 14/364,967

(22) PCT Filed: Dec. 11, 2012

(86) PCT No.: PCT/EP2012/075115
§ 371 (c)(1),
(2) Date: Jun. 12, 2014

(87) PCT Pub. No.: WO2013/087641
PCT Pub. Date: Jun. 20, 2013

(65) Prior Publication Data
US 2014/0327998 A1  Nov. 6, 2014

(30) Foreign Application Priority Data
Dec. 12, 2011 (FR) ...................................... 11 61502

(51) Int. Cl.
*H05F 3/02* (2006.01)
*G06K 7/00* (2006.01)
*G06K 19/073* (2006.01)

(52) U.S. Cl.
CPC ............... *H05F 3/02* (2013.01); *G06K 7/0082* (2013.01); *G06K 19/073* (2013.01); *Y10T 29/49117* (2015.01)

(58) Field of Classification Search
CPC ............... H05F 3/00; H05F 3/02; H05F 3/04; H01L 2924/00; H01L 2924/0002; H01L 2024/00
USPC .......................................................... 361/220
See application file for complete search history.

(56) References Cited

U.S. PATENT DOCUMENTS

2005/0260866 A1  11/2005  Kojima
2009/0253301 A1  10/2009  Chang et al.

FOREIGN PATENT DOCUMENTS

| DE | 10339281 A1 | 3/2005 |
| EP | 0608814 A1 | 1/1994 |
| JP | 63222364 A | 9/1988 |
| WO | 9733317 A1 | 9/1997 |
| WO | 0150550 A1 | 7/2001 |

(Continued)

OTHER PUBLICATIONS

John Lawrence Broschard; Card ejecting mechanism; Filing state: Jan. 24, 1994; Abstract, Fig. 1-2, Entire specification.*

(Continued)

*Primary Examiner* — Dharti Patel
(74) *Attorney, Agent, or Firm* — David D. Brush; Westman Champlin & Koehler, P.A.

(57) ABSTRACT

An electrostatic discharge device is provided for a removable electronic element. The removable electronic element is suitable for being inserted into a recess of a reading terminal for the removable electronic element. The discharge device includes a means for insertion into the reading recess subsequent to mounting of the reading terminal.

5 Claims, 3 Drawing Sheets

(56) References Cited

FOREIGN PATENT DOCUMENTS

| WO | 03021719 | A2 | 3/2003 |
| WO | 2011081870 | A2 | 7/2011 |

OTHER PUBLICATIONS

International Search Report dated Feb. 18, 2013 for corresponding International Application No. PCT/EP2012/075115, filed Dec. 11, 2012.

International Preliminary Report on Patentability and English translation of the Written Opinion dated Jul. 8, 2014 for corresponding International Application No. PCT/EP2012/075115, filed Dec. 11, 2012.

French Search Report dated Nov. 14, 2012 for corresponding French Application No. 1161502, filed Dec. 12, 2011.

* cited by examiner

ELECTROSTATIC DISCHARGE DEVICE

1. CROSS-REFERENCE TO RELATED APPLICATIONS

This Application is a Section 371 National Stage Application of International Application No. PCT/EP2012/075115, filed Dec. 11, 2012, which is incorporated by reference in its entirety and published as WO 2013/087641 on Jun. 20, 2013, not in English.

2. FIELD OF THE INVENTION

The invention pertains to a device for discharging static electricity. The invention can be applied in electronic devices which comprise detachable parts or again in electronic devices that comprise housings for receiving other devices. Such electronic devices can be smart-card readers or magnetic-stripe card readers, USB readers, etc.

The invention can be applied especially in payment terminals or identification or authentication terminals in which a smart card or a magnetic-stripe card is inserted. The invention also finds promising application in terminals that accept cards comprising a contactless antenna or cards incorporating conductive elements capable of storing static electricity.

3. PRIOR ART

The discharge of the static electricity contained in smart cards (or detachable devices such as USB sticks) is a problem to which numerous solutions have been proposed.

For example, the patent application US20090253301 dated 8 Oct. 2009 describes a SIM card connector with electrostatic discharge (ESD) protection. The patent describes a SIM card connector comprising a connector case with a plurality of contact passageways in which there is a plurality of contact terminals. The SIM card connector also comprises an integrated circuit member (IC) fixed to a lower surface of the connector housing and a plurality of solder balls sandwiched between the integrated circuit member and the contacts and placed in contact with the contact terminals. This layout enables the static electricity to be discharged from the chip of the smart card when it comes into contact with the contact terminals. This layout however has the drawback of being integrated into the connector and has the drawback of being limited to the discharging of the static electricity from the chip.

The patent application WO200150550 dated 12 Jul. 2001 also proposes a solution to this problem of static electricity. More particularly, this patent application describes a smart card receptacle comprising at least one contact to come into electrical contact with a smart card. The smart card receptacle has at least one ground contact element to protect the electronic equipment against electrostatic discharges (ESD), said ground contact element being in contact with each contact when there is no smart card inserted into the smart card receptacle. Here again, this layout has the drawback of being integrated with the connector and has the drawback of being limited to the discharging of the static electricity from the chip.

The patent applications US2005260866, DE10339281, WO03021719 and WO9733317 also describe solutions to enable a discharging of static electricity contained in a chip of a smart card or a SIM card (card intended for insertion into a communications terminal such as a mobile terminal for example). All these approaches have the drawback of being integrated with the connector and the drawback of being limited to the discharging of the static electricity from the chip.

Now, in addition to the problem of discharging static electricity from the chip, there is also the problem of the discharging static electricity from the entire card. This problem is especially great with the new cards which, in addition to a chip and a magnetic-stripe card, integrate an antenna known as a contactless antenna which enables the performance for example of operations by near-field communication (NFC). This type of problem is also present in "foil" cards, namely cards having films or foils of varying conductivity inside or outside the card. This means that the operation cannot be limited to discharging the chip of the card. There are also cards made entirely made out of metal which can then have high capacitive potential.

In addition, the introduction of novel cards integrating NFC antennas poses a problem for the prior terminals. Indeed, these terminals do not have any means for discharging static electricity from the card, or they have discharging means that are limited to the discharging of the chip. Now, it is not possible to replace all the existing terminals in their existing state to resolve this problem any more than it is economically feasible to physically modify the existing terminals by exchanging the existing smart-card connector for a novel model of memory-card connector. This would necessarily lead to a new standardized validation of the terminals.

4. SUMMARY OF THE INVENTION

In one embodiment, the invention relates to a device for the electrostatic discharging of a detachable electronic element, said detachable electronic element being intended for insertion in a housing of a reading terminal of said detachable electronic element. According to the invention, said device for discharging comprises means of insertion into said reading housing after the mounting of said reading terminal.

According to one particular characteristic, said device for electrostatic discharging is furthermore shaped so that the extraction of said device for electrostatic discharging, subsequently to its insertion, requires the dismantling of said reading terminal.

According to one particular embodiment, when said detachable electrostatic element is a smart card and when said housing offers a means of access to a smart-card reader, said device for discharging comprises at least one discharge zone shaped to come into contact with a portion of the surface of the chip of said smart card.

According to one particular embodiment, said device also comprises at least one discharge zone shaped to come into contact with a portion of the edge of said smart card.

According to one particular embodiment, said device furthermore comprises at least one locking snug to lock said device so that the extraction of said device for electrostatic discharging, subsequently to its insertion, requires the dismantling of said reading terminal.

The invention also pertains to a method for mounting a device for electrostatic discharging as described here above. According to the invention, such a method comprises a step for inserting said device into a free space between a smart-card reader and an electronic circuit and a step for locking said device by means of at least one locking snug for locking said device.

5. FIGURES

Other features and advantages of the invention shall appear more clearly from the reading of the following description of a preferred embodiment given by way of a simple, illustrative and non-exhaustive example and from the appended drawings, of which:

6. DESCRIPTION OF ONE EMBODIMENT

6.1. Reminder of the Principle of the Invention

The invention relies on the idea that terminals, even ageing ones, need to be provided with capacities for discharging the electrostatic charge contained in the smart card inserted into these terminals, in order to prevent the terminals from undergoing irreparable damage. The inventors have therefore had the idea of creating a device that fulfils this function. Unlike the prior art devices however, which are integrated by construction into the smart-card reader, the device of the invention can be inserted into an existing terminal. More particularly, the device of the invention is inserted by the slot of the smart-card reader: this characteristic means that the payment terminal does not need to be modified. This is an undeniable advantage since it greatly reduces the cost of intervention on the terminal in order to carry out the upgrade.

In addition, the device of the invention can also be put into place when mounting the apparatus. In this case, unlike in the prior-art techniques, the device of the invention is a device external to the card reader which does not require any complex mounting.

The device of the invention enabling the performance of this electronic discharge is positioned at the entry of the memory-card connector.

A part of the device is put into contact with a ground plane of the terminal and the other part rubs on the smart card.

Thus, the card is discharged at the time of its insertion, prior to the coming into contact of the chip with the contacts of the smart-card reader.

According to one particular characteristic, the device is shaped so that the edge of the card also comes into contact with at least one portion of the device. Indeed, this characteristic responds to the problem of electrostatic charge which develops in certain particular cards, known as "foil" cards. This smart-card technology known as the "foil" technology comprises a metal layer. The purpose of this layer is either aesthetic or technical. The metal layer can be on the surface of the card or held between other layers (for example plastic layers).

This characteristic is also useful for cards having a capacitive character related for example to the presence of a contactless antenna.

The embodiments can be numerous and different depending on the card readers.

As regards the materials used, it is possible to use conductive plastic materials enabling a "slow discharge of the card". These polymers and elastic strips can be combined in certain embodiments. It is also possible in one particular embodiment to make the part entirely out of thin metal plate.

Figure 1:
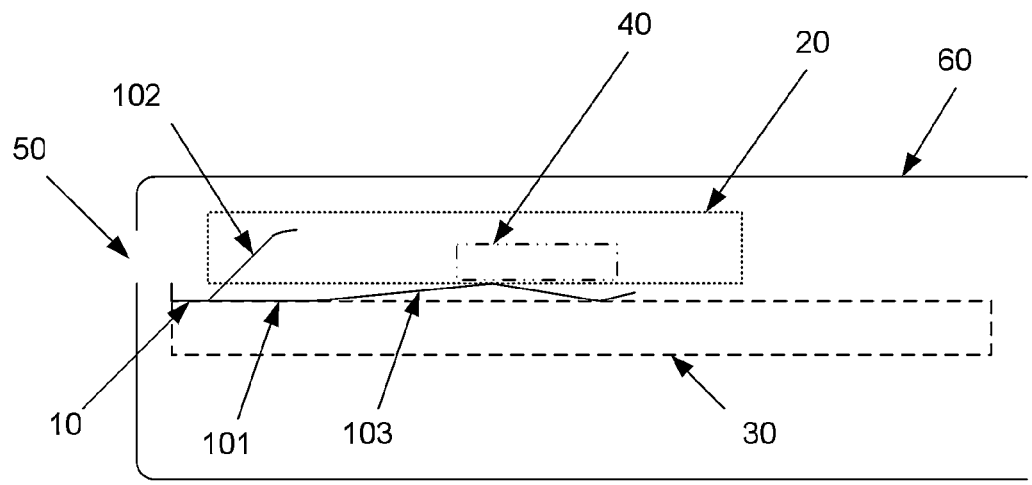
FIG. 1 is a schematic view of the positioning of the device in a terminal seen from the side.
Figure 2:
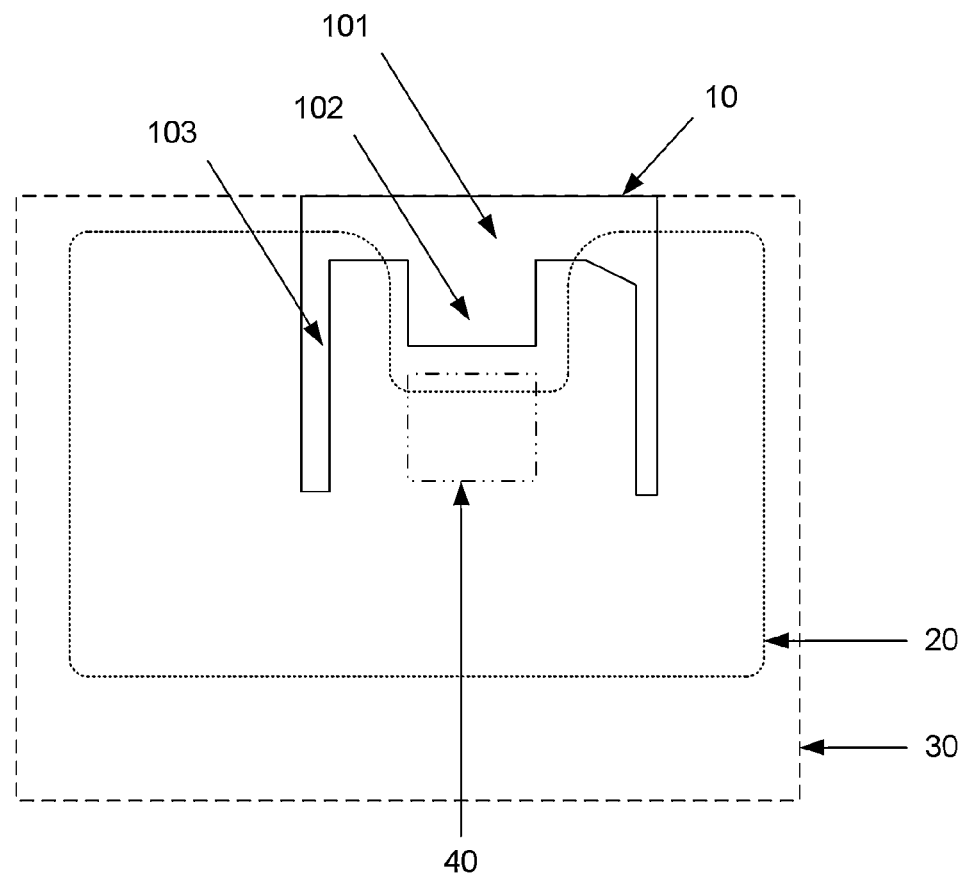
FIG. 2 is also a schematic view of the positioning of the device in a terminal seen from a top view.
Figure 3:
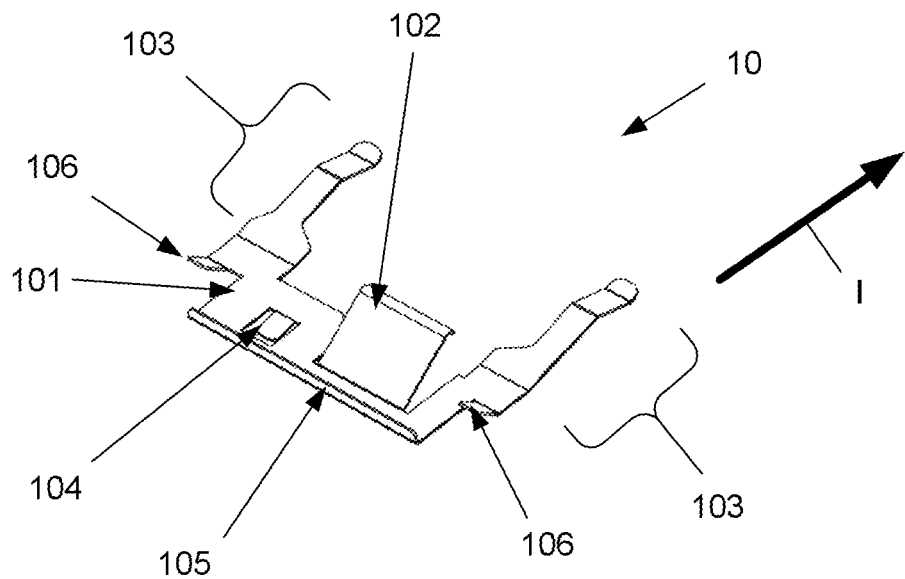
FIG. 3 is a three-quarter top view of the device according to one embodiment.
Figure 4:
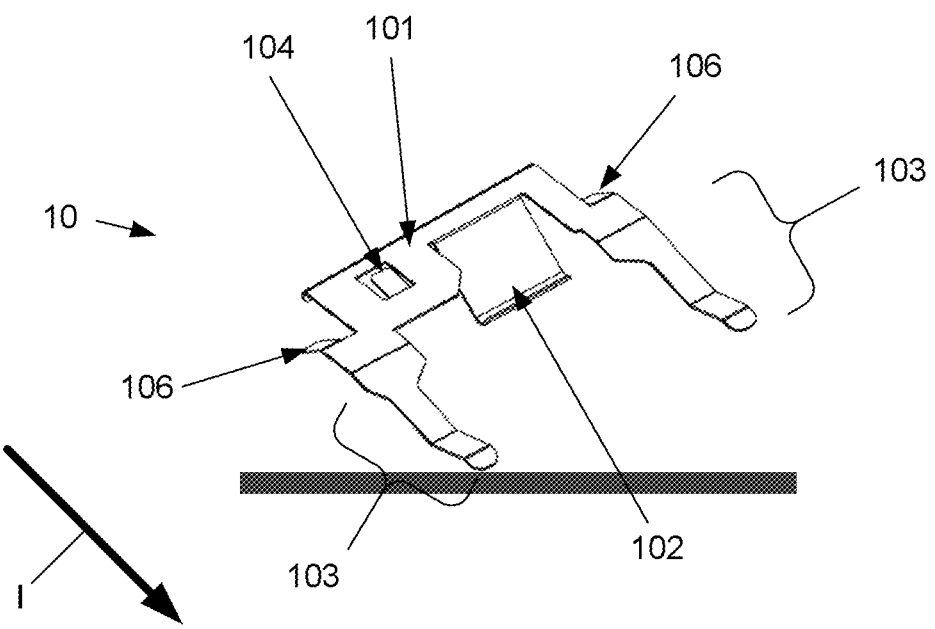
FIG. 4 is a three-quarter top view of the device according to one embodiment.

Referring to FIGS. 1 and 2, we present the way in which the device is shaped and the way in which it is positioned in the terminal once mounted. The electrostatic discharge device 10 is inserted into a housing (50) of a reader terminal (60) of the detachable electronic element (not shown, for example a smart card). As explained earlier, the discharge device (10) comprises means of insertion into said reader terminal housing (50), subsequently to the mounting of said reader terminal (60).

Figure 5:
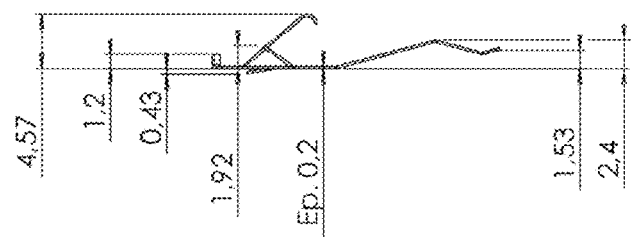
FIG. 5 is a dimensioned front side of the device according to one embodiment.
Figure 6:
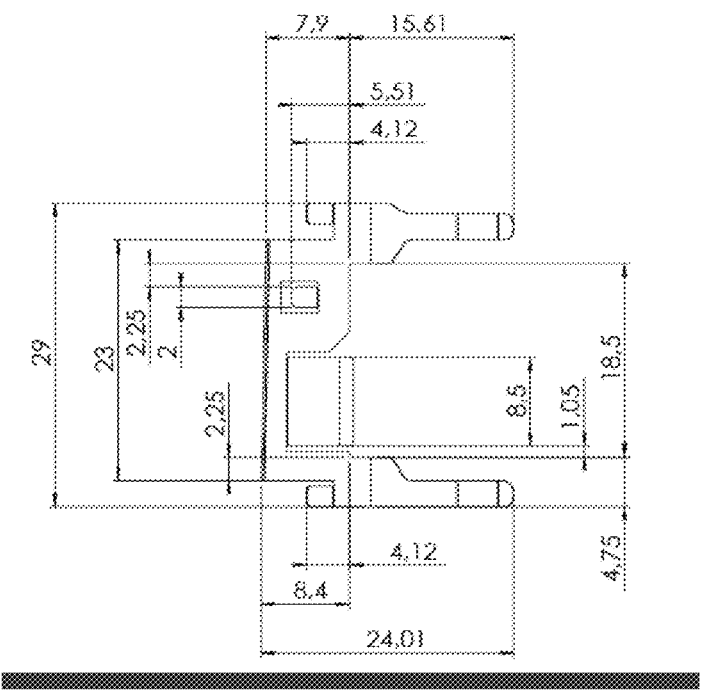
FIG. 6 is a dimensioned front view of the device according to one embodiment.
Figure 7:
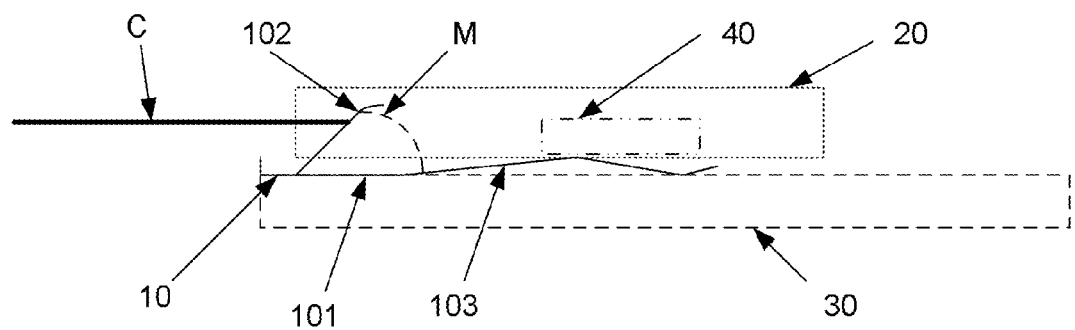
FIG. 7 is a schematic view of the positioning of the device in a terminal seen from the side, comprising the insertion of a smart card.

More particularly, the discharge device (10) according to the invention takes the form of a metal or plastic foil comprising a plane portion (101) and a plurality of portions tilted relative to this plane portion (102, 103, etc). The portions tilted relative to the plane enable the device to be inserted into an unoccupied space between a smart-card reader 20 and the electronic circuit 30 on which the smart-card reader 20 is positioned. Naturally, since FIGS. 1 and 2 are schematic, they do not comprise the electronic components and means for attaching the smart-card reader 20 to the electronic circuit 30. According to one particular characteristic of the invention, the device comprises a discharge zone 102. This discharge zone 102 is shaped to come into contact with a significant portion of the surface of the detachable electronic element to be inserted into the reader. Should the electronic element to be inserted be a smart card, the discharge zone is shaped to come into contact with the surface of the card and with the surface of the chip. Should the electronic element to be inserted be a USB stick, the discharge zone is shaped to come into contact with the external surface of the connector of the USB stick. As shown in FIGS. 5 and 6, the discharge zone 102 enables the discharging of the static electricity contained in the detachable electronic element prior to its coming into contact with the data read/write means 40.

6.2. Description of One Embodiment

Referring to FIGS. 3, 4, 5, 6 and 7, an embodiment is presented of an electrostatic discharge device according to the invention adapted to an insertion into a smart-card reader.

In this embodiment, the device (10) takes the form of an embossed metal part that can be inserted into a smart-card reader subsequently to the mounting of the payment terminal. The direction of mounting is represented by the arrow (I). Naturally, in this embodiment, the device of the invention can also be put in place when the terminal is being mounted in the factory. When it is being put in place during the mounting of the terminal, the device does not require any complex handling. Besides, owing to its shape, the device of the invention costs little and is easy to implement. This is a major difference compared with the devices of the prior art which are combined either with the smart-card reader or with the data reader unit (as for example in the patent application US20090253301).

More particularly, referring to the above-mentioned figures, the discharge device in this embodiment comprises a substantially plane surface 101 forming the base of the device. On either side of this plane base 101, two insertion pins 103 extend in the mounting direction (I). These two insertion pins 103 are introduced first into the housing 50 (see FIGS. 1 and 2). Each of them comprises a plurality of tilted portions. The object of this particular shape is to enable a certain holding of the device (10) between the smart-card reader and the PCB once the device has been inserted. On either side of the plane base 101 there are also two locking snugs 106. The locking snug 106 can take position in a hole provided for this purpose, for example on the PCB or on the smart-card reader when the device is put in place. However, its orientation and its angle are such that the locking function that it carries out can be implemented even when there is no such hole. The device also comprises a lip 105 forming a 90° angle with the base plane 101. This lip has two functions: the first is to offer a certain rigidity to the device 10. Indeed, as indicated in FIGS. 5 and 6, the material used to manufacture the device of the invention in this embodiment has a thickness of 0.2 mm. Now this thickness does not offer great rigidity to the device. This lip 105 offers additional rigidity. This lip 105 is furthermore used to enable the device 10 to be pushed when it is being inserted. Indeed, since the device is intended for insertion into a small-sized location, it must be possible to push it into this location. The presence of the lip enables the use of a small tool to exert pressure on the device in the sense of the insertion (I) to enable the introduction of the device into the available location.

In this embodiment, the device also comprises a discharge zone 102. This discharge zone 102 as explained here above enables the electrostatic discharge of the smart card when it is inserted into the smart-card reader. More particularly, the angle given to this discharge zone 102, relatively to the base plane 101, enables the discharge zone to fulfill two functions: firstly it enables the discharging of the edge of the smart card and secondly it ensures the discharging of the chip as such. Indeed, during the insertion of the card (C), this card comes into contact by the edge with the discharge device as shown schematically in FIG. 7. The edge of the card comes into contact with the discharging zone 102. As and when the card is inserted, this discharging zone is tilted (owing to the small thickness of the constituent material of the device, there is a certain degree of elasticity and the discharge zone 102 gets inclined naturally during the insertion of the card C). This means that the surface of the card which comprises the chip also comes into contact with the discharge zone 102. The motion of tilting M is represented by dashes in FIG. 7.

In other words, at the start of the insertion of the card, a first discharge step takes place during which the edge of the card is discharged. When the card continues to be inserted, the chip and the surface of the card come into contact with the discharge zone 102 and a second discharging step takes place during which the surface of the card and the chip successively come into contact with the discharge zone 102 and are therefore discharged.

Finally, in this embodiment, the device also comprises a toe 104 for placing the device in contact with the ground. Indeed, the electrostatic charge should be discharged to the ground of the terminal. This toe 104 makes it possible to fulfill this function. Naturally, in other embodiments, one of the lugs already present can perform this function.

The presentation made of the device in this embodiment of the invention is purely indicative and corresponds to a particular configuration of the device of the invention. More particularly, the measurements of FIGS. 5 and 6 (the unit of measurement of which is conventionally a millimeter or 1 mm) are given purely by way of an indication and can be modified without being of a nature such as to exclude the object of the present patent application.

An exemplary embodiment of the present application enables the problems of the prior art to be resolved. Indeed, an embodiment relates to a detachable discharging device. The special feature of this device, apart from the fact that it is detachable, is that it is moreover configured so as to be inserted into any existing terminal without its being necessary to carry out a new validation of this terminal once the device has been inserted.

It is also specified that this type of solution can be used for terminals under development, the interest of this feature being that it is again economical since the solution of the invention avoids the use of an "all-in-one" solution which is particularly costly (as presented earlier). This also avoids the choice of a new connector (all the volumes of purchases are kept to one reference and the solution averts the need for excessively lengthy and painstaking validation for a vital component).

Furthermore, the device of an embodiment enables the discharge of both the electrostatic charge of the chip contained in the card and the electrostatic charge of the card itself, especially when this card comprises near-field communications antenna.

The invention claimed is:

1. A device for electrostatic discharging of a detachable electronic element, said detachable electronic element being intended for insertion in a housing of a reading terminal of said detachable electronic element, said device for discharging comprising:
    a substantially planar portion forming a base of said device;
    a plurality of portions tilted relative to the planar portion; and
    a lip configured for insertion of said device for electrostatic discharging into said reading housing, said lip forming a 90° angle with said planar portion and being perpendicular to a mounting direction of the device in the housing of the reading terminal.

2. The device according to claim 1, wherein, said detachable electrostatic element is a smart card and said housing offers access to a smart-card reader, and wherein:
    said device for discharging comprises at least one discharge zone shaped to come into contact with a portion of a surface of a chip of said smart card.

3. The device according to claim 2, wherein the device also comprises at least one discharge zone shaped to come into contact with a portion of an edge of said smart card.

4. The device according to claim 3, wherein the device further comprises at least one locking snug configured to lock said device so that extraction of said device for electrostatic discharging, subsequently to its insertion, makes it necessary to dismantle said reading terminal.

5. A method for mounting a device for electrostatic discharging a detachable electronic element that is configured to be inserted in a housing of a reading terminal of said detachable electronic element, said method comprises:
    inserting said device into a free space between the reading terminal and an electronic circuit, wherein the device comprises:
        a substantially planar portion forming a base of said device;
        a plurality of portions tilted relative to the planar portion; and
        a lip configured for insertion of said device for electrostatic discharging into said reading housing, said lip forming a 90° angle with said planar portion and being perpendicular to a mounting direction of the device in the housing of the reading terminal; and
    locking said device by at least one locking snug.

* * * * *